United States Patent
Coons et al.

(10) Patent No.: US 11,679,812 B2
(45) Date of Patent: Jun. 20, 2023

(54) DEPLOYABLE TRAIL SIGHT

(71) Applicant: Ford Global Technologies, LLC, Dearborn, MI (US)

(72) Inventors: Martin B. Coons, Detroit, MI (US); Todd Bucher, Brownstown, MI (US); Dong Hoon Park, Canton, MI (US); James A Marleau, Jr., Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 24 days.

(21) Appl. No.: 17/403,019

(22) Filed: Aug. 16, 2021

(65) Prior Publication Data

US 2023/0052290 A1 Feb. 16, 2023

(51) Int. Cl.
| | |
|---|---|
| *B62D 25/12* | (2006.01) |
| *B60P 7/08* | (2006.01) |
| *B60R 21/34* | (2011.01) |
| *B60R 9/06* | (2006.01) |
| *B60R 9/00* | (2006.01) |
| *B60R 11/00* | (2006.01) |

(52) U.S. Cl.
CPC .............. *B62D 25/12* (2013.01); *B60R 21/34* (2013.01); *B60P 7/0807* (2013.01); *B60R 9/00* (2013.01); *B60R 9/06* (2013.01); *B60R 11/00* (2013.01); *B60R 2011/004* (2013.01); *B60R 2011/0052* (2013.01); *B60R 2011/0066* (2013.01); *B60R 2011/0082* (2013.01)

(58) Field of Classification Search
CPC ...... B62D 25/08; B62D 25/085; B62D 25/12; B62D 35/005; B62D 35/007; B62D 65/02; B62D 65/06; B60R 21/34; B60R 9/00; B60R 9/06; B60R 11/00; B60R 2011/004; B60R 2011/0042; B60R 2011/0049; B60R 2011/0052; B60R 2011/0066; B60R 2011/008; B60R 2011/0082; B60R 2011/0084; B60R 13/00; B60R 2013/016; B60P 7/00; B60P 7/0807; B60P 3/079
USPC ..... 296/193.11, 1.07, 193.09, 203.011, 80.5, 296/26.04, 26.05, 26.06, 26.07, 37.7, 198; 410/106, 110, 111, 407; 343/713, 715, 343/883, 889
See application file for complete search history.

(56) References Cited

U.S. PATENT DOCUMENTS

| | | | |
|---|---|---|---|
| 3,275,284 A | * | 9/1966 | Gary .................... B61D 45/001 410/55 |
| 3,814,461 A | | 6/1974 | Rhody |
| 6,464,437 B1 | | 10/2002 | Elwell |
| 6,637,992 B1 | * | 10/2003 | Chang ................... B60P 7/0807 410/107 |

(Continued)

FOREIGN PATENT DOCUMENTS

DE 102018004019 A1 12/2018

*Primary Examiner* — Dennis H Pedder
*Assistant Examiner* — Joyce Eileen Hill
(74) *Attorney, Agent, or Firm* — Vichit Chea; Carlson, Gaskey & Olds, P.C.

(57) ABSTRACT

A trail sight for a vehicle, according to an exemplary aspect of the present disclosure includes, among other things, a body configured to extend in a longitudinal direction along a length of a vehicle, wherein the body comprises a first portion fixed to a vehicle body structure and a second portion that is moveable relative to the first portion between a retracted position and a deployed position.

22 Claims, 3 Drawing Sheets

(56) References Cited

U.S. PATENT DOCUMENTS

| | | |
|---|---|---|
| 10,160,397 B1 | 12/2018 | Zlojutro |
| 10,759,330 B1* | 9/2020 | Salter ........................ B60Q 1/28 |
| 2004/0195866 A1* | 10/2004 | Fin .......................... B60R 9/045 |
| | | 296/210 |
| 2006/0071494 A1 | 4/2006 | Ganz |
| 2019/0118728 A1* | 4/2019 | Oba ...................... G01S 15/931 |
| 2019/0329719 A1* | 10/2019 | Brouwer ................... B60S 1/04 |
| 2020/0377025 A1 | 12/2020 | Salter et al. |
| 2020/0377028 A1 | 12/2020 | Salter et al. |
| 2021/0094460 A1 | 4/2021 | Beilman et al. |

* cited by examiner

DEPLOYABLE TRAIL SIGHT

TECHNICAL FIELD

This disclosure relates generally to a deployable trail sight that is moveable between a retracted position and a deployed position on a vehicle.

BACKGROUND

Vehicles can include a trail sight that is mounted near a front of the vehicle. The trail sight is typically visible from a driver's position and is designed to guide the driver along a vehicle path and/or to aid the drive in detecting the vehicle's boundaries.

SUMMARY

A trail sight according to an exemplary aspect of the present disclosure includes, among other things, a body configured to extend in a longitudinal direction along a length of a vehicle, wherein the body comprises a first portion fixed to a vehicle body structure and a second portion that is moveable relative to the first portion between a retracted position and a deployed position.

In a further non-limiting embodiment of the foregoing trail sight, at least one attachment interface is associated with the first portion of the body and at least one second attachment interface is associated with the second portion of the body, the at least one second attachment interface being configurable to provide an accessory mount interface and/or a tie down mount interface.

In a further non-limiting embodiment of any of the foregoing trail sights, a pivot connection couples associated ends of the first and second portions to each other such that the second portion can pivot relative to the first portion to move between the retracted position and the deployed position.

In a further non-limiting embodiment of any of the foregoing trail sights, the second portion of the body has a length extending in the longitudinal direction, a width extending in a lateral direction, and a height extending in a vertical direction, and wherein the second portion of the body has a first side and a second side opposite the first side, the first and second sides extending in the longitudinal direction and being connected to each other via a top edge to form a C-shape or U-shape, and wherein the length is greater than the width and the height.

In a further non-limiting embodiment of any of the foregoing trail sights, a thickness of the second portion of the body is defined as extending from the first side and to the second side, and including at least one opening formed to extend through an entirety of the thickness to provide an accessory mount interface and/or a tie down mount interface.

In a further non-limiting embodiment of any of the foregoing trail sights, the height varies along the length of the second portion of the body.

In a further non-limiting embodiment of any of the foregoing trail sights, the second portion includes one or more openings to provide accessory attachments and/or tie down attachments.

In a further non-limiting embodiment of any of the foregoing trail sights, a latch is selectively actuated to hold the second portion in the retracted position.

In a further non-limiting embodiment of any of the foregoing trail sights, the latch includes a first retention portion that is moveable with the second portion of the body and a second retention portion that is supported by the first portion of the body.

In a further non-limiting embodiment of any of the foregoing trail sights, one of the first and second retention portions comprises a spring loaded retention member and the other of the first and second retention portions comprises a plate portion with at least one aperture that receives the retention member.

A vehicle, according to yet another exemplary aspect of the present disclosure includes, among other things, a hood, a fender positioned on one side of the hood and spaced from the hood by a gap, and a trail sight body positioned within the gap and extending in a longitudinal direction along a length of the vehicle. The trail sight body comprises a first portion fixed to a vehicle body structure and a second portion that is moveable relative to the first portion between a retracted position and a deployed position.

In a further non-limiting embodiment of the foregoing vehicle, the gap has a first portion with a first width at a front of the hood and a second portion with a second width that is less than the first width at a rear of the hood, and wherein the trail sight body is positioned within the first portion of the gap and extends vertically above the hood when in the deployed position, and wherein the trail sight body is substantially flush with the hood when in the retracted position.

In a further non-limiting embodiment of any of the foregoing vehicles, the gap has a transition portion with a transition surface that connects the first portion to the second portion of the gap, and wherein the transition surface provides an inclined surface that faces a rear end of the trail sight body to provide a rearward locating surface, and wherein a front end of the trail sight body is at a forward open end of the gap to allow adjustability of a longitudinal position of the trail sight body within the gap.

In a further non-limiting embodiment of any of the foregoing trail sights, the second portion of the trail sight body has a length extending in the longitudinal direction, a width extending in a lateral direction, and a height extending in a vertical direction, and wherein the second portion of the trail sight body has a first side and a second side opposite the first side, the first and second sides extending in the longitudinal direction and being connected to each other via a top edge, and wherein the length is greater than the width and the height, and wherein the height varies along the length.

In a further non-limiting embodiment of any of the foregoing trail sights, a thickness of the second portion of the trail sight body is defined as extending from the first side and to the second side, and an including at least one opening formed to extend through an entirety of the thickness to provide an accessory mount interface and/or a tie down mount interface.

In a further non-limiting embodiment of any of the foregoing trail sights, an additional trail sight body supports one or more accessories and/or one or more tie downs.

In a further non-limiting embodiment of any of the foregoing trail sights, the first portion of the trail sight body includes at least one first attachment interface to hold the first portion fixed relative to the hood and wherein the second portion of the trail sight body includes at least one second attachment interface that is configurable to provide an accessory mount interface and/or a tie down mount interface.

In a further non-limiting embodiment of any of the foregoing trail sights, a latch is selectively actuated to hold the second portion in the retracted position.

In a further non-limiting embodiment of any of the foregoing trail sights, the latch includes a first retention portion that is moveable with the second portion of the body and a second retention portion that is supported by the first portion of the body, and wherein one of the first and second retention portions comprises a spring loaded retention member and the other of the first and second retention portions comprises a plate portion with at least one aperture that receive the retention member.

In a further non-limiting embodiment of any of the foregoing trail sights, the hood comprises a main portion and a forward portion that extends in a downward direction away from the main portion, and wherein, when in the deployed position, the trail sight body includes a rearward portion extending vertically above the main portion of the hood and a forward portion that decreases in height from the rearward portion to blend into the forward portion of the hood.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details an exemplary vehicle with a retractable trail sight. The retractable trail sight is located near a front of the vehicle to be visible from a driver's position when in a deployed position, and the trail sight is designed to guide the driver along a vehicle path and/or to aid the driver in detecting the vehicle's boundaries.

Figure 1:
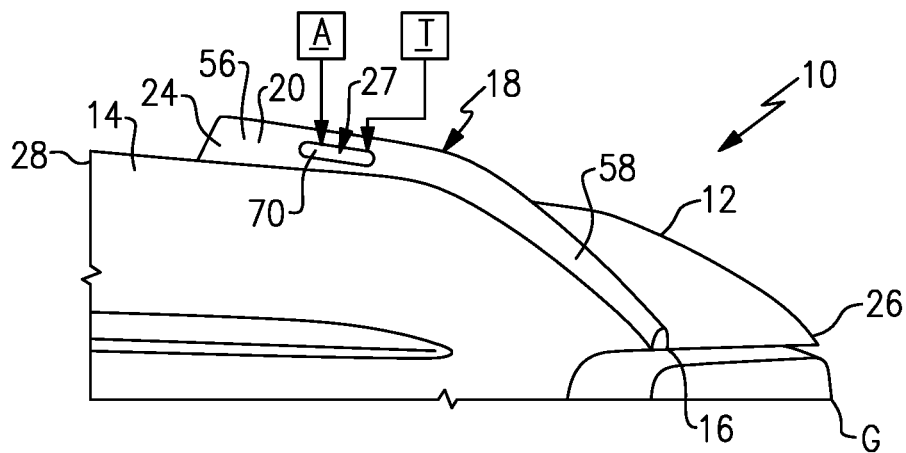
FIG. 1 illustrates a perspective view of a front of a vehicle with a trail sight that is positioned to extend in a longitudinal direction along a vehicle hood and which is in a deployed position.
Figure 2:
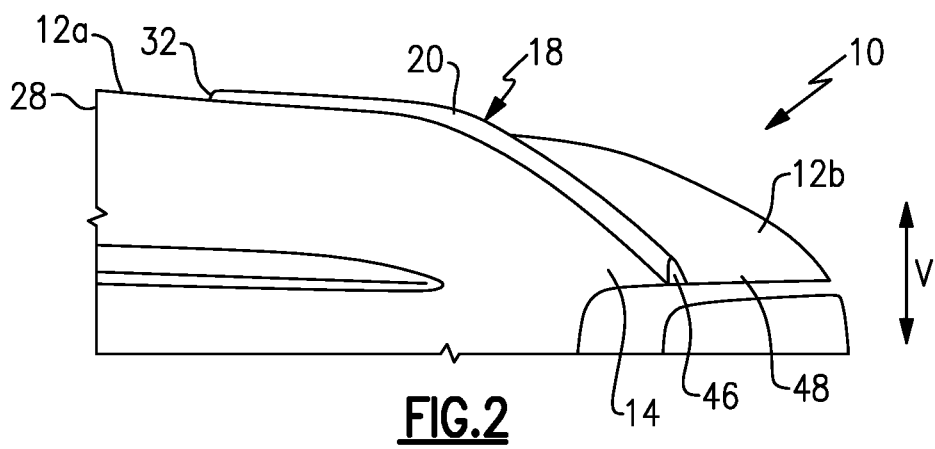
FIG. 2 is a view similar to FIG. 1 but showing the trail sight in a retracted position.

FIG. 1 shows a vehicle 10 that includes a hood 12 and a fender 14 that is positioned on one side of the hood 12. A front grill G is positioned on a front of the vehicle 10 and is spaced apart from a front edge of the hood. The fender 14 is spaced from the hood 12 by a gap 16. A trail sight 18 is positioned within the gap 16 and extends in a longitudinal direction along a length of the vehicle 10. Another trail sight 18 could also be located in a similar position on the opposite side of the hood 12. The trail sight 18 comprises an elongated body 20 that includes a first portion 22 and a second portion 24 (FIG. 4) that is moveable relative to the first portion 22 between a deployed position (FIG. 1) and retracted position (FIG. 2).

Figure 4:
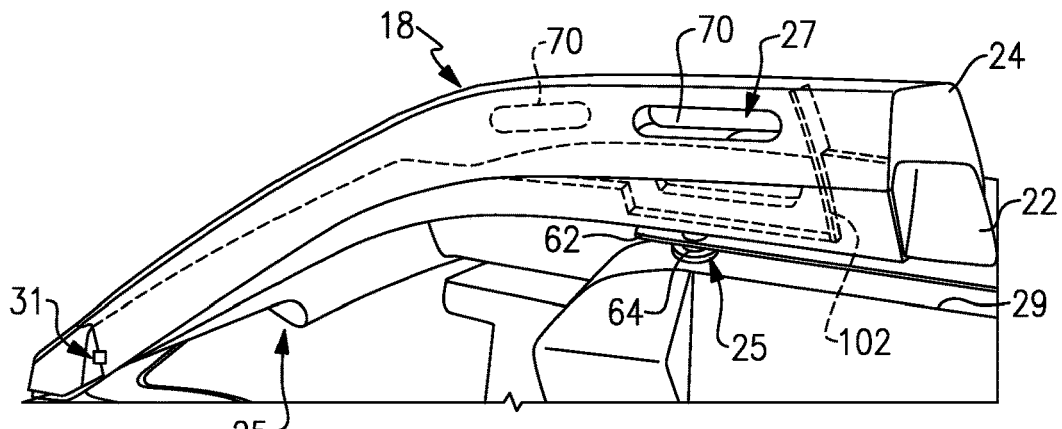
FIG. 4 is a perspective side view of the trail sight of FIG. 1 showing the trail sight having a first portion fixed to a vehicle structure and a second portion movable relative to the first portion.

In one example, there is at least one attachment interface 25 associated with the first portion 22 of the body 20, and at least one second attachment interface 27 (FIG. 1) is associated with the second portion 24 of the body 20. The at least one first attachment interface 25 fixes the first portion 22 of the body 20 to a vehicle body structure 29 as shown in FIG. 4. The at least one second attachment interface 27 is configurable to provide an accessory mount interface and/or a tie down mount interface. The accessory mount interface can be used to attach an accessory A to the vehicle 10 and the tie down mount interface can be used to receive a rope or strap to provide a tie down T as shown in FIG. 1.

In one example, the trail sight includes a pivot connection 31 (FIG. 4) that couples associated ends of the first 22 and second 24 portions to each other such that the second portion 24 can pivot relative to the first portion 22 to move between the retracted position and the deployed position. In one example, the pivot connection 31 comprises an opening formed in one of the first 22 and second 24 portions and a pin or tab that is fixed to the other of the first 22 and second 24 portions, where the pin or tab is received in the opening. Other types of pivot connection interfaces could also be used.

As discussed above, the body of the trail sight 18 is received within the gap 16 between the hood 12 and the fender 14. The gap 16 has a first portion 16a with first width W1 at a front 26 of the hood 12 and a second portion 16b with a second width W2 that is less than the first width W1 at a rear 28 of the hood 12. The trail sight body 20 is positioned within the first portion 16a of the gap 16 and extends vertically above the hood 12 when in the deployed position as shown in FIG. 1. The trail sight body 20 is retracted within the gap 16 such that the body is flush with, or extends only slightly above the hood 12, when in the retracted position shown in FIG. 2.

The gap 16 has a transition portion 16c with a transition surface 30 that connects the hood surface defining the first portion 16a of the gap 16 to the hood surface defining the second portion 16b of the gap 16. In one example, the transition surface 30 provides an inclined surface on the hood 12 that faces a rear end 32 of the trail sight body 20 to provide a rearward locating/reference surface. A front end 34 of the trail sight body 20 is at a forward open end 36 of the gap 16 to allow adjustability during installation of a longitudinal position of the trail sight body 20 within the gap 16. The entire trail sight body 20 can also be adjusted vertically within the gap 16 during installation. This adjustability in multiple directions accounts for any manufacturing/tolerancing issues and ensures that the trail sight 18 is in the correct desired position relative to the hood 12 when in the deployed position.

Figure 3:
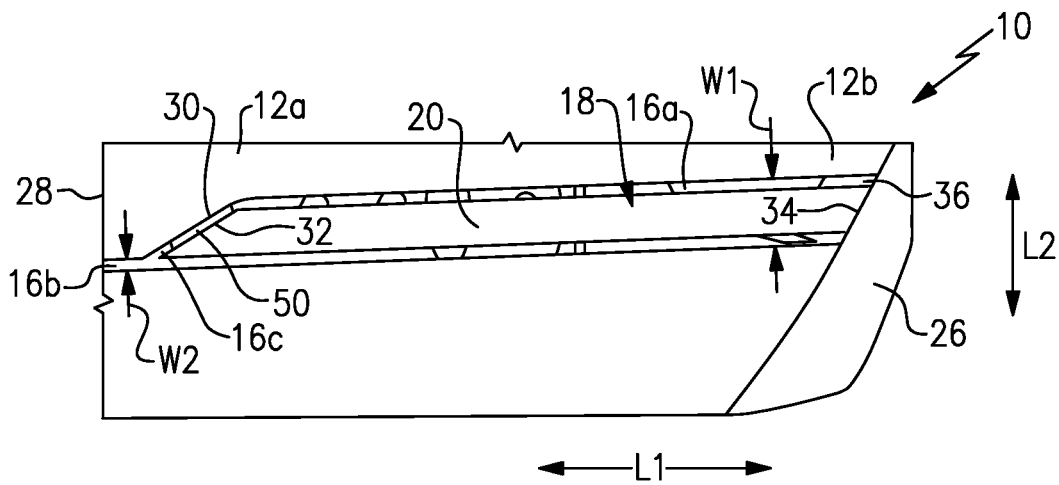
FIG. 3 is a top view of FIG. 2.

As shown in FIGS. 1 and 3, the second portion 24 of the body 20 of the trail sight 18 extends in a longitudinal direction L1 along a length of a vehicle. As such, the second portion 24 of the body 20 has a length extending in the longitudinal direction L1, a width extending in a lateral direction L2, and a height extending in a vertical direction V (FIG. 2). The second portion 24 further has a first side 38 and a second side 40 opposite the first side 38. The first 38 and second 40 sides extend in the longitudinal direction L1 and are connected to each other via a top edge 42 to form a U-shape or C-shape. The second portion 24 of the body 20 is open at a bottom 44 to provide an open area or cavity that receives the first portion 22 when in the retracted position. A thickness of the second portion 24 of the body 20 is defined as extending from the first side 38 to the second side 40.

In one example, the length of the second portion 24 of the body 20 is greater than the width and the height of the second portion 24 of the body 20.

In one example, the height varies along a length of the second portion 24 of the body 20. In one example, the height at the front end 34 of the second portion 24 of the body 20 is less than a height at the rear end 32 of the body 20.

In one example, a forward facing edge surface 46 (FIG. 2) of the second portion 24 of the body 20 is a straight surface or planar surface that is flush with a front edge 48 of the hood 12.

In one example, a rearward facing edge surface 50 of the second portion 24 of the body 20 is an inclined surface that generally matches the inclination of the transition surface 30 on the hood 12 that forms the transition portion 16c of the gap 16. This transition surface 30 defines the maximum reward position of the trail sight 18 once installed within the gap 16.

In one example, the hood 12 comprises a main portion 12a and a forward portion 12b that extends in a downward direction away from the main portion 12a. In one example, the forward portion 12b comprises a curved surface that provides for aerodynamic flow. In one example, when in the deployed position, the trail sight body 20 includes a first portion 56 extending vertically above the main portion 12a of the hood 12 and a second portion 58 that decreases in height from the first portion 56 to blend into the forward portion 12b of the hood 12.

In one example shown in FIG. 3, the at least one first attachment interface 25 is associated with a bottom edge of the first portion 22 of the body 20 and is used to mount the first portion 22 of the body 20 to the vehicle body structure 29. The first attachment interface 25 is configured to hold the first portion 22 of the body 20 fixed to the vehicle structure 29 while the second portion 24 of the body 20 moves relative to the first portion 22 as the trail sight 18 moves between the deployed and retracted positions. In one example, the first attachment interface 25 further comprises at least one mounting flange 62 extending outward of the first portion 22 of the body 20 in the lateral direction L2 transverse to the longitudinal direction L1.

In one example, the first attachment interface 25 comprises one or more fasteners 64 that mount the first portion 22 of the body 20 to the vehicle structure 29. In one example, there are a plurality of mounting flanges and/or fasteners. In one example, the fasteners 64 each comprise a nut and an associated bolt; however, other types of fasteners or attachment interfaces could also be used.

In one example, the first attachment interface 25 is positioned along a more rearward portion of the first portion 22 of the body 20 of the trail sight 18 to provide improved stability.

In one example, the at least one second attachment interface 27 is formed within a rearward portion of the second portion 24 of the body 20. The second attachment interface 27 is configurable in a variety of different ways to provide an accessory mount interface and/or a tie down mount interface. In one example, the second attachment interface 27 comprises at least one opening 70 formed to extend through an entirety of the thickness of the second portion 24 of the body 20. The opening 70 can be used to mount the accessory A (FIG. 1) such as a camera, light, etc., or can serve as a tie-down area T (FIG. 1) to receive a rope or strap attachment, for example. In another example, the at least one opening 70 comprises two or more openings 70 extending through the entirety of the thickness of the second portion 24 of the body 20. In another example, multiple trail sights 18 can be installed that include a plurality of openings to mount accessories and/or serve as tie down areas.

In another example, the second attachment interface 27 comprises at least one opening 70 formed to extend through an entirety of the thickness of the body 20, where the at least one opening 70 comprises a single elongated opening (FIG. 1) having a length greater than a height. In this example, the single elongated opening 70 comprises a tie down mount interface or can be used to attach an accessory. Thus, the at least one second attachment interface 27 provides a beneficial configuration that provides both an accessory mount interface and a tie down mount interface.

Figure 5:
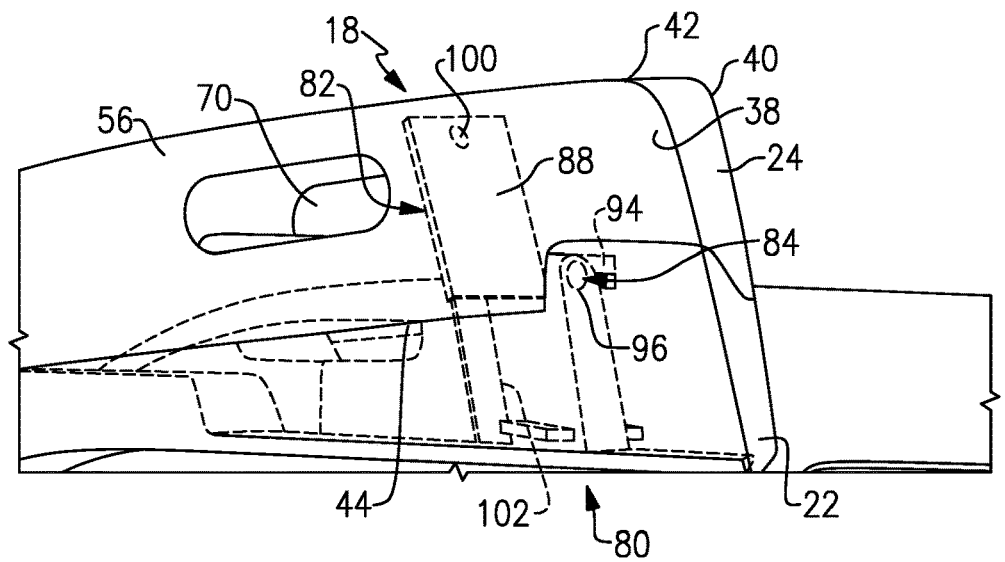
FIG. 5 is an enlarged view of one end of the trail sight of FIG. 4 and showing a latch mechanism.
Figure 6:
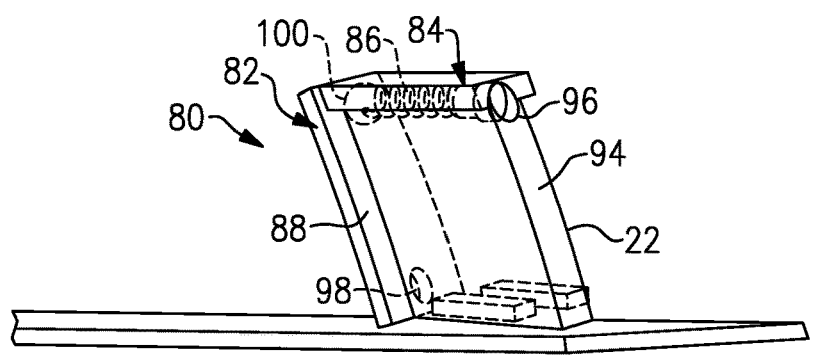
FIG. 6 is a perspective view of the latch mechanism of FIG. 5.

In one example shown in FIGS. 5-6, the trail sight 18 includes a latch 80 that is selectively actuated to hold the second portion 24 in the retracted position. The latch 80 includes a first retention portion 82 that is moveable with the second portion 24 of the body 20 and a second retention portion 84 that is supported by the first portion 22 of the body 20. In one example, one of the first 82 and second 84 retention portions comprises a spring loaded retention member 86 and the other of the first 82 and second 84 retention portions comprises a plate portion 88 with at least one aperture that receives the retention member 86. In one example, the spring loaded retention member 86 comprises a spring and ball assembly; however, the latch 80 could also comprise structures such as a push/push assembly, detents, gravity, or other types of components for applying spring-loaded pressure, for example.

In one example, the first portion 22 includes a T-shaped section 94 with a bore 96 that receives the spring and ball assembly. In one example, the bore 96 extends in the longitudinal direction at an intersection of a laterally extending portion of the T-shaped section 94 with the vertically extending portion of the T-shaped section 94. The plate portion 88 is fixed for movement with the second portion 24 and includes a lower opening 98 and an upper opening 100. The plate portion 88 fits into a slot 102 formed the first portion 22 when the second portion 24 is pushed down over the first portion 22. The ball of the spring assembly is received within the lower opening 98 to hold the second portion 24 in the deployed position. The ball of the spring assembly is received within the upper opening 100 to hold the second portion 24 in the retracted position. The biasing force of the spring is overcome via a pushing movement to move the second portion 24 back and forth between the retracted and deployed positions.

In one example, the trail sight 18 is assembled as follows. The first portion 22 and the spring and ball assembly are fixed in place first. The moveable second portion 24 is then articulated down such that the spring and ball latch into place. The pivot connection 31 can then be made at the front of the trail sight 18.

Figure 7:
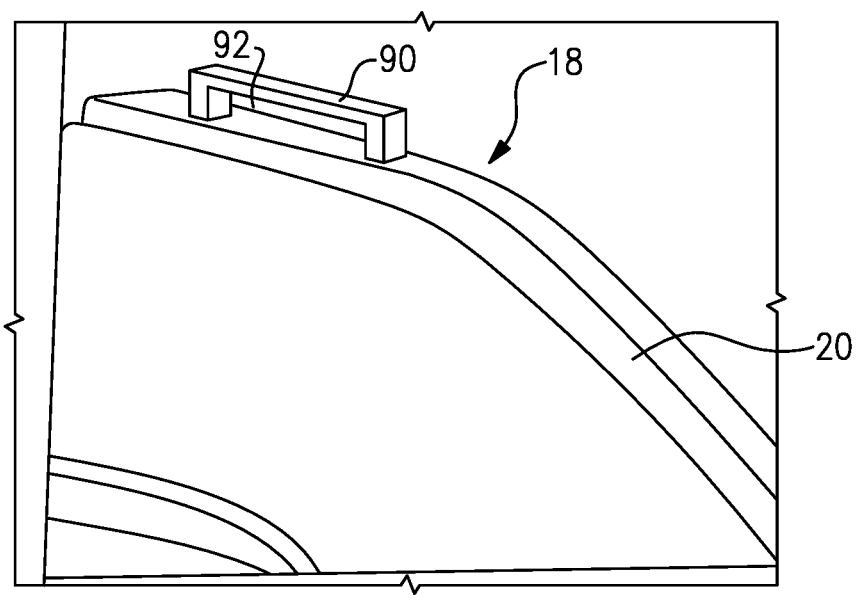
FIG. 7 is another example that shows a retractable attachment feature that is in a deployed position.
Figure 8:
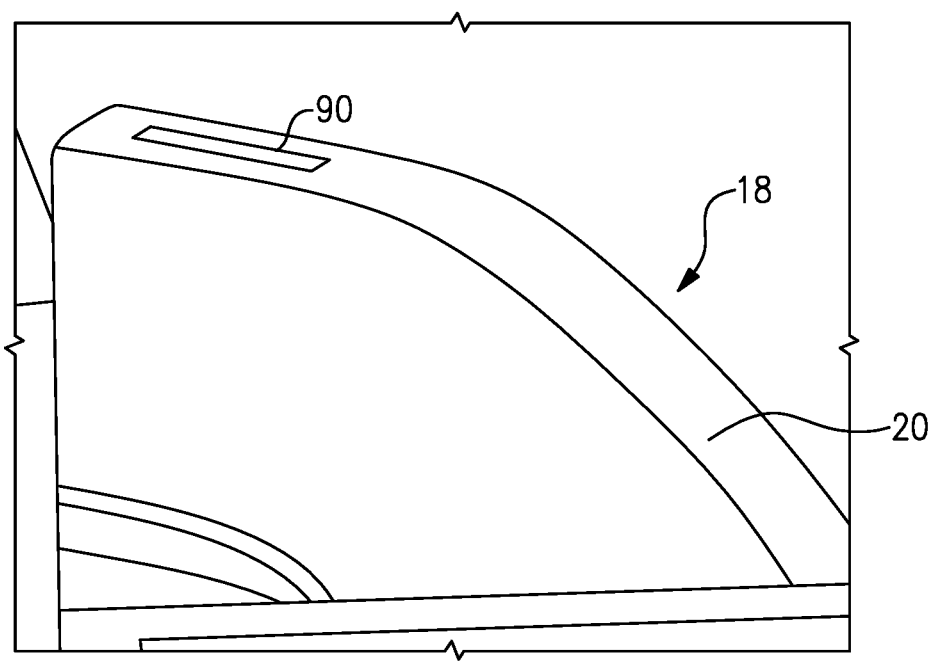
FIG. 8 shows the retractable attachment feature of FIG. 7 in a retracted position.

In another example shown in FIGS. 7-8, the trail sight 18 can also include a retractable second attachment interface 27. In this example, the second attachment interface 27 moves from a deployed position (FIG. 7) to a retracted position (FIG. 8). In one example, the second attachment interface 27 comprises a C-shaped handle 90 that provides an opening 92 to mount an accessory A or to serve as a tie down area T. The handle 90 can be latched into place in the retracted position using a latch as described above.

The disclosure provides a trail sight 18 that allows the driver to be spatially aware of the edge of the vehicle and provides guidance to the path needed to maneuver around or pass objects. This is specifically helpful when the front of the vehicle is sloped downward and out of sight of the driver. The disclosed trail 18 is useful for both on-road and on-trail situations. The trail sight 18 is thus located at the front of the vehicle and can be mounted to the hood, fender, bumper, cowl, grill, etc. The disclosed trail sight 18 additionally provides a re-configurable attachment interface that can be used to mount one or more accessories and/or provide a tie down mount structure. Additionally, the trail sight is configured to be retractable such that when the trail sight is not being used, it can be more flush with the vehicle hood.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A trail sight for a vehicle, comprising:
   a body configured to extend in a longitudinal direction along a length of a vehicle, wherein the body comprises a first portion fixed to a vehicle body structure and a second portion that is moveable relative to the first portion between a retracted position and a deployed position where the second portion is visible from a driver's position, and wherein the second portion has an open cavity that receives the first portion when in the retracted position and moves away from the first portion when in the deployed position.

2. The trail sight according to claim 1, including at least one attachment interface associated with the first portion of the body and at least one second attachment interface associated with the second portion of the body, the at least one second attachment interface being configurable to provide an accessory mount interface and/or a tie down mount interface, and including a pivot attachment between the first portion and the second portion wherein the open cavity extends in the longitudinal direction away from the pivot connection.

3. The trail sight according to claim 1, wherein the body is configured to be positioned within a gap between a fender and a hood, and wherein the second portion of the body extends in the longitudinal direction from a forward end to a rearward end with a height of the second portion in the retracted position decreasing from the rearward end to the forward end, and including a pivot connection that couples associated forward ends of the first and second portions to each other at a front of the hood such that the second portion can pivot relative to the first portion to move between the retracted position and the deployed position.

4. The trail sight according to claim 1, wherein the second portion of the body has a length extending in the longitudinal direction, a width extending in a lateral direction, and a height extending in a vertical direction, and wherein the second portion of the body has a first side and a second side opposite the first side, the first and second sides extending in the longitudinal direction and being connected to each other via a top edge to form a C-shape or U-shape, and wherein the length is greater than the width and the height, and wherein the second portion of the body is open at a bottom to provide the open cavity that receives the first portion when in the retracted position.

5. The trail sight according to claim 4, wherein a thickness of the second portion of the body is defined as extending from the first side and to the second side, and including at least one opening formed to extend through an entirety of the thickness to provide an accessory mount interface and/or a tie down mount interface.

6. The trail sight according to claim 4, wherein the height varies along the length of the second portion of the body.

7. The trail sight according to claim 1, wherein the second portion includes one or more openings to provide accessory attachments and/or tie down attachments.

8. The trail sight according to claim 1, including a latch that is selectively actuated to hold the second portion in the retracted position.

9. The trail sight according to claim 8, wherein the latch includes a first retention portion that is moveable with the second portion of the body and a second retention portion that is supported by the first portion of the body.

10. The trail sight according to claim 1, wherein the second portion includes a first accessory mount interface and/or a tie down mount interface, and including a handle body that retracts within the second portion and provides a second accessory mount interface and/or a tie down mount interface when the handle body is in a deployed position.

11. A trail sight for a vehicle, comprising:
    a body configured to extend in a longitudinal direction along a length of a vehicle, wherein the body comprises a first portion fixed to a vehicle body structure and a second portion that is moveable relative to the first portion between a retracted position and a deployed position; and
    a latch that is selectively actuated to hold the second portion in the retracted position, wherein the latch includes a first retention portion that is moveable with the second portion of the body and a second retention portion that is supported by the first portion of the body, and wherein one of the first and second retention portions comprises a spring loaded retention member and the other of the first and second retention portions comprises a plate portion with at least one aperture that receives the retention member.

12. A vehicle comprising:
    a hood;
    a fender positioned on one side of the hood and spaced from the hood by a gap;
    a trail sight body positioned within the gap and extending in a longitudinal direction along a length of the vehicle, wherein the trail sight body comprises a first portion fixed to a vehicle body structure and a second portion that is moveable relative to the first portion between a retracted position and a deployed position, and wherein the second portion extends in the longitudinal direction from a forward end to a rearward end and has an open cavity that receives the first portion when in the retracted position; and
    a pivot connection that couples associated forward ends of the first and second portions to each other at a front of the hood such that the second portion can pivot relative to the first portion to move between the retracted position and the deployed position.

13. The vehicle according to claim 12, wherein the gap has a first portion with a first width at the front of the hood and a second portion with a second width that is less than the first width at a rear of the hood, and wherein the trail sight body is positioned within the first portion of the gap and extends vertically above the hood when in the deployed position, and wherein the trail sight body is substantially flush with the hood when in the retracted position.

14. The vehicle according to claim 12, wherein the second portion of the trail sight body has a length extending in the longitudinal direction, a width extending in a lateral direction, and a height extending in a vertical direction, and wherein the second portion of the trail sight body has a first side and a second side opposite the first side, the first and second sides extending in the longitudinal direction and being connected to each other via a top edge, and wherein the length is greater than the width and the height, and wherein the height varies along the length, and wherein the second portion of the body is open at a bottom to provide the open cavity that receives the first portion when in the retracted position.

15. The vehicle according to claim 14, wherein a thickness of the second portion of the trail sight body is defined as extending from the first side and to the second side, and an including at least one opening formed to extend through an entirety of the thickness to provide an accessory mount interface and/or a tie down mount interface.

16. The vehicle according to claim 12, including an additional trail sight body to support one or more accessories and/or one or more tie downs.

17. The vehicle according to claim 12, wherein the first portion of the trail sight body includes at least one first attachment interface to hold the first portion fixed relative to the hood and wherein the second portion of the trail sight body includes at least one second attachment interface that is configurable to provide an accessory mount interface and/or a tie down mount interface.

18. The vehicle according to claim 12, including a latch that is selectively actuated to hold the second portion in the retracted position.

19. The vehicle according to claim 12, wherein the hood comprises a main portion and a forward portion that extends in a downward direction away from the main portion, and wherein, when in the deployed position, the trail sight body includes a rearward portion extending vertically above the main portion of the hood and a forward portion that decreases in height from the rearward portion to blend into the forward portion of the hood.

20. The vehicle according to claim 12, wherein the second portion includes a first accessory mount interface and/or a tie down mount interface, and including a handle body that retracts within the second portion and provides a second accessory mount interface and/or a tie down mount interface when the handle body is in a deployed position.

21. A vehicle comprising:

a hood;

a fender positioned on one side of the hood and spaced from the hood by a gap, wherein the gap has a first portion with a first width at a front of the hood and a second portion with a second width that is less than the first width at a rear of the hood; and a trail sight body positioned within the gap and extending in a longitudinal direction along a length of the vehicle, wherein the trail sight body comprises a first portion fixed to a vehicle body structure and a second portion that is moveable relative to the first portion between a retracted position and a deployed position, and wherein the trail sight body is positioned within the first portion of the gap and extends vertically above the hood when in the deployed position, and wherein the trail sight body is substantially flush with the hood when in the retracted position, and wherein the gap has a transition portion with a transition surface that connects the first portion to the second portion of the gap, and wherein the transition surface provides an inclined surface that faces a rear end of the trail sight body to provide a rearward locating surface, and wherein a front end of the trail sight body is at a forward open end of the gap to allow adjustability of a longitudinal position of the trail sight body within the gap.

22. A vehicle comprising:

a hood;

a fender positioned on one side of the hood and spaced from the hood by a gap; and a trail sight body positioned within the gap and extending in a longitudinal direction along a length of the vehicle, wherein the trail sight body comprises a first portion fixed to a vehicle body structure and a second portion that is moveable relative to the first portion between a retracted position and a deployed position; and a latch that is selectively actuated to hold the second portion in the retracted position, and wherein the latch includes a first retention portion that is moveable with the second portion of the body and a second retention portion that is supported by the first portion of the body, and wherein one of the first and second retention portions comprises a spring loaded retention member and the other of the first and second retention portions comprises a plate portion with at least one aperture that receive the retention member.

* * * * *